United States Patent

Hata et al.

[11] Patent Number: 6,068,828
[45] Date of Patent: May 30, 2000

[54] ZIRCONIA POWDER, METHOD FOR PRODUCING THE SAME, AND ZIRCONIA CERAMICS USING THE SAME

[75] Inventors: Kazuo Hata, Himeji; Norikazu Aikawa, Hyogo-ken; Keijirou Takasaki, Himeji, all of Japan

[73] Assignee: Nippon Shokubai Co., Ltd., Osaka, Japan

[21] Appl. No.: 09/094,481

[22] Filed: Jun. 10, 1998

[30] Foreign Application Priority Data

Jun. 13, 1997 [JP] Japan ................................ 9-156268
Jul. 15, 1997 [JP] Japan ................................ 9-188835

[51] Int. Cl.[7] .......................... C01G 25/02; C01B 35/48; B01J 31/00; B01J 23/00
[52] U.S. Cl. ..................... 423/608; 501/103; 502/105; 502/349; 502/351
[58] Field of Search .................... 423/593, 600, 423/608; 501/103, 127; 502/349, 101

[56] References Cited

U.S. PATENT DOCUMENTS

| | | | |
|---|---|---|---|
| 4,010,242 | 3/1977 | Iler et al. | 423/335 |
| 4,065,544 | 12/1977 | Hamling et al. . | |
| 4,664,894 | 5/1987 | Suzuki et al. . | |
| 4,764,357 | 8/1988 | Sherif et al. | 423/338 |
| 4,778,671 | 10/1988 | Wusirika | 423/592 |
| 4,842,832 | 6/1989 | Inoue et al. | 423/211 |
| 5,011,673 | 4/1991 | Kreichbaum et al. . | |
| 5,055,442 | 10/1991 | Osaka et al. | 502/439 |
| 5,057,360 | 10/1991 | Osaka et al. . | |
| 5,188,991 | 2/1993 | Kreichbaum et al. . | |
| 5,196,180 | 3/1993 | Hartshorn | 423/593 |
| 5,252,316 | 10/1993 | Kreichbaum et al. . | |
| 5,275,759 | 1/1994 | Osaka et al. | 252/313.1 |
| 5,358,695 | 10/1994 | Helble et al. | 423/592 |
| 5,391,364 | 2/1995 | Cogliati | 423/335 |
| 5,447,708 | 9/1995 | Helble et al. | 423/593 |

FOREIGN PATENT DOCUMENTS

| | | |
|---|---|---|
| 0 013 599 | 7/1980 | European Pat. Off. . |
| 0 392 685 | 10/1990 | European Pat. Off. . |
| 0 704 413 A2 | 4/1996 | European Pat. Off. . |
| 1-153530 | 6/1989 | Japan . |
| 4-130018 | 5/1992 | Japan . |
| 4-202016 | 7/1992 | Japan . |
| 8-151270 | 6/1996 | Japan . |
| 8-151271 | 6/1996 | Japan . |
| 8-151275 | 6/1996 | Japan . |
| 1 345 631 | 1/1974 | United Kingdom . |

OTHER PUBLICATIONS

"Zirconia Ceramics 1" Dec. 1, 1983, Uchida Rokakuho Publishing Co., Ltd. pp. 1–19 (w/ Partial Translation).

Derwent Abstracts, AN 95–018982, JP 06 305731, Nov. 1, 1994.

Primary Examiner—Steven P. Griffin
Assistant Examiner—Cam N. Nguyen
Attorney, Agent, or Firm—Oblon, Spivak, McClelland, Maier & Neustadt, P.C.

[57] ABSTRACT

A zirconia powder has an average particle diameter in a range from larger than 0.5 μm to 0.8 μm, and particles of 90 volume percent of the zirconia powder having a diameter of 1.5 μm or smaller. Using this zirconia powder, a zirconia ceramics having uniform quality can be produced. The zirconia powder of the present invention can be efficiently produced by wet-milling a raw material powder using balls under a condition satisfying the following mathematical relation (I):

$$1 \times 10^{12} \leq (W_1^2 \div W_2) \times (\omega^2 \div d) \times T \leq 1 \times 10^{14} \qquad (I)$$

where $W_1$ is the weight (g) of balls, $W_2$ is the weight (g) of the raw material powder, $\omega$ is the peripheral velocity (cm/min) at outer periphery of a rotor, $d$ is the diameter (cm) of a milling chamber, and $T$ is the milling time (min).

12 Claims, 1 Drawing Sheet

ZIRCONIA POWDER, METHOD FOR PRODUCING THE SAME, AND ZIRCONIA CERAMICS USING THE SAME

FIELD OF THE INVENTION

The present invention relates to a zirconia powder, a method for producing the same, and a zirconia ceramics including the same. More specifically, the present invention relates to a zirconia powder having uniform quality and suitable for producing a zirconia ceramics with high reliability, a method for producing the zirconia powder with high efficiency, and a zirconia ceramics having uniform quality and high reliability produced by using the zirconia powder.

BACKGROUND OF THE INVENTION

Ceramics are widely used in many fields thanks to its excellent mechanical properties such as heat resistance and abrasion resistance, as well as electric and magnetic properties and biocompatibility. Among them, ceramic sheets including zirconia as a main component can be effectively used as sensor parts, electrolyte film for solid oxide fuel cells and setters for calcination because of its excellent oxygen ion conductivity and heat and corrosion resistance.

Usually, the above-described ceramic sheet including zirconia is produced by the following method. First, a slurry containing zirconia powder, organic binder, and a solvent is formed into a sheet by a doctor blade method, a calendar rolling method or an extrusion method. The resultant sheet is dried to evaporate the solvent to form a green sheet. The green sheet is arranged to a suitable size by cutting or punching, and then placed on a setter and calcined to decompose or remove the organic binder and to sinter the ceramic powder.

As to the zirconia powder used as raw material for ceramics formed products, there are various reports on its production methods and the physical properties of the ceramics produced by using the zirconia powder. However, most of them refer to only a particle diameter of the zirconia powder, but are silent regarding the particle size distribution. In fact, few of them refer to both the particle diameter and the particle size distribution.

Japanese Unexamined Patent Publication No. 1-153530 describes a ceramics formed product produced by using zirconia powder having a primary particle diameter of 0.1 to 0.5 $\mu$m, and the particles of 90 volume percent of the zirconia powder preferably have a diameter of 0.1 to 1 $\mu$m. Japanese Unexamined Patent Publication No. 4-130018 describes a ceramics formed product produced by using zirconia powder having an average particle diameter of 1.3 to 3.0 $\mu$m measured by centrifugation, in which particles having a particle diameter of 1 to 20 $\mu$m accounts for 45 to 75 weight percent of the entire zirconia powder. Japanese Unexamined Patent Publication No. 4-202016 describes three types of zirconia powder, that is: (1) a zirconia powder having a particle diameter of 0.60 to 4.00 $\mu$m and an average particle diameter of 2.05 to 2.12 $\mu$m, in which the particles having a particle diameter of 1.00 to 3.00 $\mu$m accounts for 87 to 90 percent of the entire zirconia powder; (2) a zirconia powder having a particle diameter of 0.80 to 4.00 $\mu$m and an average particle diameter of 2.18 to 2.22 $\mu$m, in which the particles having a particle diameter of 1.00 to 3.00 $\mu$m accounts for 82 to 85 percent of the entire zirconia powder; and (3) a zirconia powder having a particle diameter of 0.88 to 4.00 $\mu$m and an average particle diameter of 2.00 to 2.04 $\mu$m, in which the particles having a particle diameter of 1.00 to 3.00 $\mu$m accounts for 86 to 90 percent of the entire zirconia powder.

However, the ceramic sheets produced by using the above-described conventional zirconia powders are likely to have warping and waviness. Such ceramic sheets do not have a flat surface, and have poor load resistance and bending strength. These problems become especially serious in producing a ceramic sheet having a large size and thin thickness.

In order to solve the problems of the prior art, the present inventors have proposed a novel ceramic sheet and a method for producing the same in Japanese Unexamined Patent Publications Nos. 8-151270, 8-151271, and 8-151275. In Japanese Unexamined Patent Publications Nos. 8-151270, 8-151271, and 8-151275, a ceramic sheet is produced using a ceramics powder having an average particle diameter of 0.1 to 0.5 $\mu$m, in which the particles of 90 volume percent of the ceramic powder have a diameter of 1 $\mu$m or smaller. The ceramic powder is produced by the following method. First, a raw material powder having an average particle diameter of 1.5 $\mu$m, in which the particles of 90 volume percent of the powder have a diameter of 3 $\mu$m or smaller is mixed with water to prepare a slurry containing 20 weight percent of the raw material powder. The slurry is milled with a bead mill for 2 hours, thereby obtaining the ceramic powder.

However, this method has a problem. As described above, the slurry contains 20 weight percent of raw material powder and it takes two hours for milling the slurry into the ceramic powder. This results in low productivity. In order to increase the productivity, it may be considered that larger amount of raw material powder is used in the slurry. However, the mere increase in the amount of raw material powder used simply extends the milling time, sometime the slurry becomes too viscous to mill any more and no improvement of productivity will result.

Furthermore, there is another problem as follows. In general, it is preferable that the ceramic powder has fine particles with narrow particle size distribution, i.e., the standard deviation of the distribution curve is small. When the ceramic sheet is produced from a green sheet including a ceramic powder having fine particle size, for example, an average particle diameter of 0.1 to 0.5 $\mu$m, in which the particles of 90 volume percent of the ceramics powder have a diameter of 1 $\mu$m or smaller, large amount of binder is required to produce the green sheet. When the green sheet includes large amount of binder, the binder cannot be sufficiently removed when the green sheet is fired. This results in the formation of warping or waviness in the resultant ceramic sheet, or non-uniformity of the mechanical strength on the surface of the ceramic sheet.

SUMMARY OF THE INVENTION

An objective of the present invention is to provide a zirconia powder, a method for producing a zirconia powder, and a zirconia ceramics produced by using a zirconia powder that have overcome the problems of the prior art.

According to one aspect of the invention, a zirconia powder has an average particle diameter of larger than 0.5 but not exceeding 0.8 $\mu$m, and particles of 90 volume percent of the zirconia powder have a diameter of 1.5 $\mu$m or smaller.

The zirconia powder is advantageous in efficiently producing a zirconia ceramics. Especially, the zirconia powder is advantageous in efficiently producing a zirconia ceramics by forming methods such as doctor blade method and calendar rolling method under normal pressure and then by sintering the resultant under normal pressure.

The diameter of particles of the zirconia powder is measured by a laser beam scattering method. The term "volume percent" of the zirconia powder means a ratio of a volume of zirconia particles accumulated from the smallest with respect to the whole volume of the zirconia powder.

According to another aspect of the invention, a method for producing a zirconia powder includes the step of wet-milling a raw material powder using balls under a condition satisfying a mathematical relation (I), and preferably a mathematical relation (II):

$$1 \times 10^{12} \leq (W_1^2 + W_2) \times (\omega^2 + d) \times T \leq 1 \times 10^{14} \quad (I)$$

$$1 \times 10^{12} \leq (W_1^2 + W_2) \times (\omega^2 + d) \times T \leq 5 \times 10^{13} \quad (II)$$

where $W_1$ is the weight (g) of balls, $W_2$ is the weight (g) of the raw material powder, $\omega$ is the peripheral velocity (cm/min) at an outer periphery of a rotor, d is the diameter (cm) of a milling chamber, and T is the milling time (min).

According to another aspect of the invention, a method for producing zirconia powder having an average particle diameter of 0.1 to 0.8 μm, and particles of 90 volume percent of the zirconia powder having a diameter of 1.5 μm or smaller, includes the step of wet-milling a raw material powder using balls, the raw material powder having an average particle diameter of larger than 0.8 μm, and particles of 90 volume percent of the raw material powder having a diameter of larger than 1.5 μm, wherein the wet-milling is conducted under a condition satisfying the mathematical relation (II):

$$1 \times 10^{12} \leq (W_1^2 + W_2) \times (\omega^2 + d) \times T \leq 5 \times 10^{13} \quad (II)$$

where $W_1$ is the weight (g) of balls, $W_2$ is the weight (g) of the raw material powder, $\omega$ is the peripheral velocity (cm/min) at an outer periphery of a rotor, d is the diameter (cm) of a milling chamber, and T is the milling time (min).

According to another aspect of the invention, a method for producing a zirconia powder includes the step of wet-milling a raw material powder using balls, wherein a slurry containing 30 to 70 weight percent of the raw material powder is wet-milled under a condition satisfying the mathematical relation (I):

$$1 \times 10^{12} \leq (W_1^2 + W_2) \times (\omega^2 + d) \times T \leq 1 \times 10^{14} \quad (I)$$

where $W_1$ is the weight (g) of balls, $W_2$ is the weight (g) of the raw material powder, $\omega$ is the peripheral velocity (cm/min) at an outer periphery of a rotor, d is the diameter (cm) of a milling chamber, and T is the milling time (min).

Under the condition satisfying the mathematical relation (I), a zirconia powder having an average particle diameter of 0.1 to 0.8 μm, in which particles of 90 volume percent of the zirconia powder having a diameter of 1.5 μm or smaller can be produced with high productivity. Under the condition satisfying the mathematical relation (II), the zirconia powder of the present invention can be produced with higher productivity.

According to another aspect of the invention, a zirconia ceramics is produced by using a zirconia powder as a raw material having an average particle diameter of larger than 0.5 but not exceeding 0.8 μm, and particles of 90 volume percent of the zirconia powder have a diameter of 1.5 μm or smaller.

According to another aspect of the invention, a zirconia ceramics is produced by using a zirconia powder as a raw material in which particles of 90 volume percent of the zirconia powder have a diameter of 1.5 μm or smaller that falls within the range of 1.5 to 2.0 times larger than an average particle diameter of the zirconia powder ranging from larger than 0.5 but not exceeding 0.8 μm.

Thus-produced zirconia ceramics has uniform quality and high reliability.

The term "zirconia ceramics" means a product produced by sintering the zirconia powder of the present invention, and a product produced by firing a green body obtained by forming the zirconia powder or a slurry containing the zirconia powder. Typically, the zirconia ceramics has two-dimensional shapes such as a sheet and a plate, three-dimensional shapes such as a sphere, a cylinder, a rectangular column, and the zirconia ceramics may have holes in the forms described above.

The above and other objects, features and advantages of the present invention will become more apparent upon a reading of the following detailed description and drawings.

DETAILED DESCRIPTION OF THE PREFERRED EMBODIMENTS OF THE INVENTION

Figure 1:
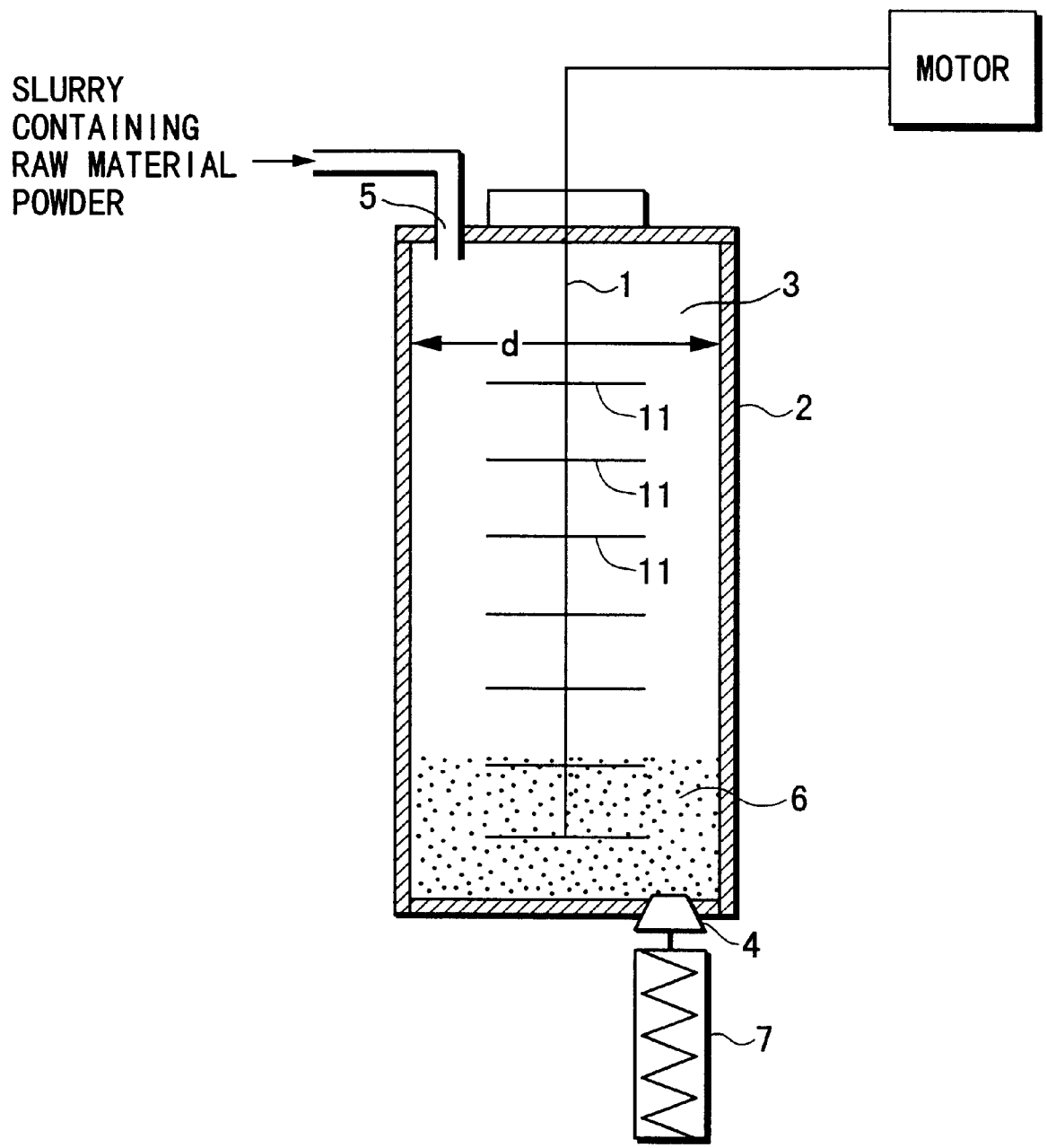
FIG. 1 is a schematic diagram showing a construction of a mill used in embodiments of the present invention.

As a result of thorough studies, the present inventors have found that desired effects can be attained with the use of zirconia powder having a specific particle diameter and a specific particle size distribution which will be described later. Even in the case of producing the zirconia powder using a slurry containing 30 weight percent or more of a raw material powder, the zirconia powder can be efficiently produced in a relatively short time, specifically, less than 2 hours, by wet-milling the slurry under the condition where the diameter of the milling chamber, the peripheral velocity at the outer periphery of the rotor, and the weight of the balls are properly determined.

The zirconia powder is made to have an average particle diameter of larger than 0.5 but not exceeding 0.8 μm, and particles of 90 volume percent of the zirconia powder have a diameter of 1.5 μm or smaller.

It is further possible to obtain a zirconia powder in which the particles of 90 volume percent thereof have a diameter of 1.5 μm or smaller that falls within the range of 1.5 to 2.0 times larger than the average particle diameter ranging from larger than 0.5 but not exceeding 0.8 μm.

The zirconia powder is produced by wet-milling a raw material powder using balls under a condition satisfying a mathematical relation (I):

$$1 \times 10^{12} \leq (W_1^2 + W_2) \times (\omega^2 + d) \times T \leq 1 \times 10^{14} \quad (I)$$

where $W_1$ is the weight (g) of balls, $W_2$ is the weight (g) of the raw material powder, $\omega$ is the peripheral velocity (cm/min) of an outer periphery of a rotor, d is the diameter of a milling chamber, and T is the milling time (min).

Furthermore, the zirconia powder can be produced by wet-milling a raw material powder using balls under a condition satisfying a mathematical relation (II):

$$1 \times 10^{12} \leq (W_1^2 + W_2) \times (\omega^2 + d) \times T \leq 5 \times 10^{13} \quad (II)$$

where $W_1$ is the weight (g) of balls, $W_2$ is the weight (g) of raw material powder, $\omega$ is the peripheral velocity (cm/min) of the outer periphery of a rotor, d is the diameter of a milling chamber, and T is the milling time (min).

The raw material powder has an average particle diameter of larger than 0.8 μm, and particles of 90 volume percent of the raw material powder have a diameter of larger than 1.5 μm.

Furthermore, the zirconia powder can be produced by wet-milling a raw material powder having an average particle diameter of larger than 0.8 μm, and particles of 90 volume percent of the raw material powder having a diameter of larger than 1.5 μm under the condition satisfying the mathematical relation (II). In this manner, it is possible to produce a zirconia powder having an average particle diameter of 0.1 to 0.8 μm, in which particles of 90 volume percent of the zirconia powder have a diameter of 1.5 μm or smaller.

Furthermore, the zirconia powder can be produced by wet-milling a slurry containing 30 to 70 weight percent of the raw material powder under the condition satisfying the mathematical relation (I).

When the zirconia powder is produced using the slurry containing the raw material powder at a concentration of 30 to 70 weight percent, the raw material powder has an average particle diameter of larger than 0.8 μm, and particles of 90 volume percent of the raw material powder have a diameter of larger than 1.5 μm. In this case, the slurry may include 0.01 to 5 weight percent of a dispersant with respect to the raw material powder.

In the present invention, the zirconia ceramics is produced using the zirconia powder having an average particle diameter of larger than 0.5 but not exceeding 0.8 μm, in which particles of 90 volume percent of the zirconia powder have a diameter of 1.5 μm or smaller. The zirconia ceramics may have a form of sheet.

Furthermore, the zirconia ceramics may be produced using the zirconia powder in which particles of 90 volume percent of the zirconia powder have a diameter of 1.5 μm or smaller that falls within the range of 1.5 to 2.0 times larger than the average particle diameter. The zirconia ceramics may have a form of sheet.

The zirconia powder of the present invention (this powder is for use in producing a zirconia ceramics and is distinguished from "raw material powder" which is for use in producing the zirconia powder.) contains zirconia as a main component. Specifically, the zirconia powder contains 60 weight percent or more of zirconia, and preferably 80 weight percent or more of zirconia. On top of zirconia, the zirconia powder further includes at least one oxide selected from the group consisting of yttrium (Y) oxide, cerium (Ce) oxide, calcium (Ca) oxide, magnesium (Mg) oxide, titanium (Ti) oxide, silica (Si) oxide, and aluminum (Al) oxide, and preferably at least one oxide selected from yttrium oxide, cerium oxide and calcium oxide, and the preferable content thereof is 1 to 20 weight percent. Especially preferable zirconia powder includes 5 to 18 weight percent of yttrium oxide and 82 to 95 weight percent of zirconia.

The zirconia powder of the present invention has an average particle diameter of larger than 0.5 but not exceeding 0.8 μm, in which the particles of 90 volume percent of the zirconia powder have a diameter of 1.5 μm or smaller. Preferably, the particles of 90 volume percent of the zirconia powder have a diameter of larger than 1 to 1.5 μm. The most preferably, the particles of 90 volume percent of the zirconia powder have a diameter 1.5 to 2.0 times, and preferably 1.5 to 1.8 times larger than the average particle diameter of the zirconia powder. The maximum particle diameter of the zirconia powder is 10 μm, and preferably 8 μm, and more preferably 5 μm. Therefore, the zirconia powder of the present invention contains only small amount of particles having a diameter as large as 2 μm or larger, i.e., having a particle size distribution curve with narrow width.

In the present invention, an average particle diameter and a particle diameter of 90 volume percent are measured by a laser beam scattering method. In the laser beam scattering method, the particle diameter of the zirconia powder is measured in the state where the zirconia powder is suspended in water or an aqueous solution to coagulate the zirconia powder particles from the primary particles into the secondary particles. In the present invention, the secondary particle sizes are measured to obtain the average particle diameter and the particle diameter.

Although any method can be employed for producing the zirconia powder as far as the zirconia powder has the above-described sizes, the zirconia powder can be effectively produced by the production method of the present invention.

Hereinafter, the method for producing the zirconia powder according to the present invention will be described.

In the production of the zirconia powder, a raw material powder is mixed with solvent to produce a slurry, and the slurry is put into a mill where the slurry is wet-milled.

The raw material powder preferably has an average particle diameter of larger than 0.8 μm, and the particles of 90 volume percent thereof have a diameter of larger than 1.5 μm. More preferably the raw material powder has an average particle diameter of 0.9 to 1.5 μm, and the particles of 90 volume percent thereof have a diameter of 2.0 to 5.0 μm.

The raw material powder such as described above may be industrially available. Examples of such a powder include OZC-8YC (a product of Sumitomo Osaka Cement Co., Ltd.) and TZ-8Y (a product of Tosoh Corporation).

A mill including balls is used for wet milling. FIG. 1 is a diagram showing a construction of V-series Kemco Apex Mill (a product of Kotobuki Giken Kogyo Co, Ltd.) which is an example of the mill used in the present invention. In FIG. 1, the mill includes a milling chamber 3 in the form of a cylinder (diameter d) formed with a jacket 2. Inside the milling chamber 3 is filled with balls 6 (total weight $W_1$) for use in wet milling and is provided with a rotor 1. The slurry containing the raw material powder is supplied into the milling chamber 3 through a supply port 5 formed on the jacket 2. The rotor 1 has a plurality of pins (as a stirring member) 11 extending from the center of the rotor. When the rotor 1 is driven by a motor, the slurry and the balls are agitated to wet-mill the slurry. As a result, the zirconia powder is obtained. Then, a valve 4 is opened to let the obtained zirconia powder and the balls 6 pass through the separator 7 where the zirconia powder is separated from the balls 6. The AMV-1 type Apex Mill has a specification as follows: the effective capacity of the milling chamber is one liter; the diameter (d) of the milling chamber is 80 mm; the height of the milling chamber is 240 mm; the maximum peripheral velocity at the outer periphery 11 is 6.03 m/sec at the frequency of 50 Hz; and the rotation speed is 480 to 1920 rpm at the frequency of 50 Hz, which corresponds to 570 to 2304 rpm at the frequency of 60 Hz.

It should be noted that the term "the peripheral velocity at the outer periphery of the rotor" is meant to be the peripheral velocity at the leading end of pin (a position at the most radially outward from the center of the rotor).

The mill is not necessarily limited to that shown in FIG. 1, and may be of any type as far as it has a hermetically closed-type milling chamber in which balls and a rotor having pins can be set. The material of the balls is not necessarily limited either. Notes preferable diameter of the balls however, is 0.3 to 3 mm.

The wet milling is performed under the condition satisfying the mathematical relation (I).

In the mathematical relation (I), it is preferable to satisfy the relationship of $W_1/W_2 \geq 0.1$. In the case of using AMV-1 type Apex Mill, it is preferable to satisfy the following relationship: $0.5 \leq W_1/W_2 \leq 1.5$, and more preferably $0.8 \leq W_1/W_2 \leq 1.2$; $3 \leq \omega \leq 8$ (m/sec), and more preferably $5 \leq \omega \leq 7$ (m/sec.); d=80 mm; and T<120 (min).

Under the condition satisfying the mathematical relation (I), the zirconia powder can be produced in a relatively short time, specifically, less than 2 hours. The slurry may contain large amount of the raw material powder, for example, 40 weight percent in the presence of dispersant. With the dispersant, the slurry containing such a large amount of raw material powder can be sufficiently wet-milled. This results in enhancing productivity and providing industrial advantages.

When the slurry contains the dispersant, the zirconia powder can be more effectively produced by wet-milling the slurry under the condition satisfying the mathematical relation (II).

By conducting the wet milling using the raw material powder described above under the condition satisfying the mathematical relation (I) or (II), it is possible to obtain the zirconia powder having an average particle diameter of 0.1 to 0.8 μm, in which the particles of 90 volume percent thereof have a diameter of 1.5 μm or smaller. It is further possible to obtain the zirconia powder having an average particle diameter of 0.1 to 0.8 μm, and the particles of 90 volume percent thereof have a diameter of 1.5 μm or smaller which falls within the range of 1.5 to 2.0 times, and preferably 1.5 to 1.8 times the average particle diameter. In addition, the zirconia powder having an average particle diameter of larger than 0.5 but not exceeding 0.8 μm, in which the particles of 90 volume percent thereof have a diameter of larger than 1 to 1.5 μm can be also obtained by properly setting the weight ($W_1$) of the balls, the weight ($W_2$) of the raw material powder, the peripheral velocity ($\omega$) at the outer periphery of the rotor, the diameter (d) of the milling chamber, and the milling time (T), or alternatively, such a zirconia powder is selectively taken out by classification.

As described above, the raw material powder is mixed with solvent to produce a slurry, and the slurry is put into a mill where the slurry is wet-milled. Any solvent can be used as far as it does not inhibit the wet-milling. Examples of the solvent include water; alcohols having 9 carbon atoms such as methanol, ethanol, isopropanol, butanol, and octanol; aromatic hydrocarbons such as toluene and xylene, esters such as ethyl acetate and butyl acetate; cellosolves such as methyl cellosolve, ethyl cellosolve, and butyl cellosolve. These may be used alone or in combination of two or more of them. Typical examples of mixed solvent include a mixture of non-aqueous solvent and aqueous solvent such as toluene/ethanol, ethyl acetate/isopropanol, toluene/butyl cellosolve.

The slurry contains 30 to 70 weight percent of the raw material powder, and more preferably 30 to 50 weight percent of the raw material powder. If the concentration of the raw material powder is too high, the wet-milling of the slurry becomes difficult.

A dispersant may be added to the slurry in order that the raw material powder sufficiently disperses in the slurry. With the addition of the dispersant, it is possible to sufficiently wet-mill the slurry containing the raw material of high concentration, for example, 40 to 70 weight percent of the raw material powder, and 45 to 55 weight percent of the raw material powder. This results in further enhancing the productivity of the zirconia powder.

Examples of dispersant used in the present invention include organic acids such as formic acid, citric acid, and tartaric acid; polymer electrolytes such as polyacrylic acid, and polyacrylic ammonium; surfactants such as branched polymer nonionic surfactant, carboxylic acid type surfactant, ammonium β-naphthalenesulfonate, polymer surfactant, and nonionic surfactant (for example, Discol: a product of Dai-ichi Kogyo Seiyaku Co., Ltd; and Homogenol: a product of Kao Corporation); ethers such as polyoxyethylene nonyl phenyl ether, polyoxyethylene alkyl ether (for example, Ionet: a product of Sanyo Chemical Industries, Ltd.); copolymers of partially esterified dicarboxylic acid or partially esterified carboxylic acid (for example, Bunsan G-200: a product of Kyoeisha Kagaku Co., Ltd.; and Floren G-700: a product of Kyoeisha Kagaku Co., Ltd.); acrylic acid ester based dispersant and maleic acid ester based dispersant (for example, Oricox: a product of Kyoeisha Kagaku Co., Ltd.); and glycerine, sorbitan fatty acid ester, polyoxyethylene fatty acid diester, and the like. Among them, especially preferable are copolymers of partially esterified dicarboxylic acid or partially esterified carboxylic acid, which are surfactants having acid values.

Preferable amount of dispersant to be added to the slurry is 0.01 to 5 weight percent with respect to the raw material powder, and more preferably 0.3 to 2 weight percent.

As described above, the raw material powder is mixed with the solvent in the presence of dispersant to produce the slurry. The slurry contains 30 weight percent or more of raw material powder, and more preferably 40 to 70 weight percent of the raw material powder, and is wet-milled using the balls.

The raw material powder, the solvent, and the dispersant may be put into the mill where they are mixed with each other to produce the slurry. Or alternatively, the raw material powder, the solvent, and the dispersant may be mixed with each other to produce the slurry, and then, the resultant slurry is put into the mill. The wet-milling may be conducted batchwise or continuously.

The wet-milled slurry may be used as a raw material for producing a zirconia ceramics as it is, or may be dried under reduced pressure to obtain a zirconia powder used for producing a zirconia ceramics. Or alternatively, a predetermined amount of a binder and a plasticizer may be added to the wet-milled slurry to produce a green product.

The wet-milled slurry can be dried under reduced pressure by a rotary evaporator or an oscillation fluidized drier (for example, VU-60: a product of Chuo Kakoki Co., Ltd.).

In the present invention, the average particle diameter and the particle diameter accounting for 90 volume percent of the raw material powder are measured by a laser diffraction system particle size distribution measuring apparatus (SALD-1100: brand name, manufactured by Shimadzu-Seisakusho K.K.). The measurement was taken by the following manner. About 0.01 to 0.1 g of the raw material powder and about 100 g of 0.2% sodium hexametaphosphate aqueous solution were put into a beaker, and were stirred with stirrer. Then, after the raw material powder was dispersed for 60 seconds by ultrasonic wave, the particle size measurement of two seconds was repeated four times within the measurement range covering 0.1 to 45 μm. Thereafter, the values from four times of measurements were averaged to obtain the average particle diameter and the diameter of the particles accounting for 90 volume percent of the raw material.

The same steps were repeated to obtain the average particle diameter and the particle diameter accounting for 90 volume percent of the zirconia powder.

Hereinafter, the zirconia ceramics will be described.

The zirconia ceramics of the present invention is produced using the zirconia powder of the present invention.

The zirconia ceramics of the present invention can be produced by a conventional method as far as the zirconia powder of the present invention is used. That is, any conventional forming methods may be employed such as injection molding, pressing, slip casting, extrusion, and sheet forming. However, the zirconia powder is especially preferable in producing a zirconia ceramics by a doctor blade method and a calendar rolling method under normal pressure, and by further sintering process.

The zirconia ceramics will be further described as to the case where the zirconia ceramics is produced from a zirconia green sheet for convenience of explanation.

The zirconia powder of the present invention is mixed with a binder and a solvent, and further mixed with a dispersant and a plasticizer if necessary by a conventional ball mill method to produce a slurry. The slurry is formed into the form of a sheet by a doctor blade method or a calendar rolling method to produce a green sheet.

The binder used in the present invention is not specifically limited, and may be suitably selected from commercially available organic or inorganic binders. Examples of organic binders include ethylene-based copolymers, styrene-based copolymers, acrylate and methacrylate-based copolymers, vinyl acetate-based copolymers, maleic acid-based copolymers, vinyl butyral-based resins, vinyl acetal-based resins, vinyl formal-based resins, vinyl alcohol-based resins, waxes, and celluloses such as ethyl cellulose. Examples of inorganic binders include zirconia sol, silica sol, alumina sol, and titania sol.

The use amount of the binder may be suitably determined depending upon the required strength and flexibility of the green sheet, and the viscosity of the slurry. For example, 10 to 30 parts by weight of binder is used with respect to 100 parts by weight of zirconia powder.

The solvent used for preparing the slurry is not necessarily limited, and may be suitably selected from conventionally used organic solvents and water. Examples of organic solvents include: alcohols such as methanol, ethanol, 2-propanol, 1-butanol, and 1-hexanol; ketones such as acetone and 2-butanone: aliphatic hydrocarbons such as pentane, hexane, and heptane; aromatic hydrocarbons such as benzene, toluene, xylene, and ethylbenzene; and acetic esters such as methyl acetate, ethyl acetate, and butyl acetate.

The use amount of the solvent can suitably be controlled in such a manner that the viscosity of the slurry preferably falls in a range of 20 to 200 poise.

The slurry is casted onto a polymer film such as polyethylene terephthalate (PET) by a conventional method such as doctor blade method and calendar rolling method. Then, the resultant is dried to produce a green sheet. The green sheet usually has a thickness of 0.1 to 2 mm.

Thus-obtained green sheet is placed on a setter, for example, a porous alumina setter, and is sintered at 1200 to 1700° C. under normal pressure, thereby producing a zirconia ceramics in the form of a sheet.

The quality and reliability of the zirconia ceramics are generally indicated by Weibull modulus (m). Weibull modulus (m) shows the variety in mechanical strength by a statistically generated theory. The higher the value of Weibull modulus (m), the smaller the variety in mechanical strength of the zirconia sheet becomes, and therefore, is preferable. The zirconia ceramics of the present invention has a value of Weibull modulus (m) of 10 or higher.

EXAMPLE

Hereinafter, the present invention will be further described by way of Examples.

[Relationship between the method for producing a zirconia powder and the produced zirconia powder]

In Examples 1 to 6 and Comparative Examples 1 and 2, the following condition is assumed to be met:

$$(W_1^2 + W_2) \times (\omega^2 + d) \times T \leq X$$

EXAMPLE 1

Into Apex Mill (AMV-1 type: a product of Kotobuki Giken Kogyo Co., Ltd. which has a milling chamber of 8 cm diameter. Hereinafter, Apex Mill indicates the same type as this.), added were 4 kg of commercially available zirconia powder (OZC-8YC: a product of Sumitomo Osaka Cement Co., Ltd.) having an average particle diameter of 0.84 $\mu$m in which particles of 90 volume percent thereof have a diameter of 2.65 $\mu$m as a raw material powder, and 6 kg of pure water as a solvent. The Apex Mill included 4 kg of zirconia balls having a diameter of 0.5 mm (specific gravity: 6 g/cm$^3$). The raw material powder mixed with pure water was wet-milled at 7 m/sec of the peripheral velocity ($\omega$) at the outer periphery of the rotor driven by a motor for 1 hour to produce a slurry. In this case, the value X was $5.3 \times 10^{13}$.

Into a rotary evaporator, 10 liters of the slurry was put, and 10 liters of octanol was further added thereto. The resultant was heated under reduced pressure to distillate water, thereby obtaining octanol-substituted slurry. The slurry was further heated under reduced pressure to distillate octanol, and the resultant was dried under reduced pressure, thereby producing a zirconia powder. The particle size of the zirconia powder was measured with a particle size distribution measuring apparatus (SALD-1100: a product of Shimadzu Seisakusho K.K.). The zirconia powder had an average particle diameter of 0.66 $\mu$m, and the particles of 90 volume percent thereof had a diameter of 1.3 $\mu$m.

EXAMPLE 2

Into the mill of the same type as used in Example 1, added were 5.5 kg of the same type of the raw material powder as used in Example 1, 44 g of formic acid as a dispersant and 5 kg of pure water as a solvent. The mill included 4 kg of zirconia balls having a diameter of 0.5 mm (specific gravity: 6 g/cm$^3$). Then, the mixture was wet-milled at 5 m/sec of the peripheral velocity at the outer periphery of the rotor driven by a motor for 10 minutes to produce a slurry. In this case, the value of X was $3.3 \times 10^{12}$.

The slurry was subjected to the same steps as in Example 1 to produce a zirconia powder. The particle size of the zirconia powder was measured by the same manner as in Example 1. The zirconia powder had an average particle diameter of 0.48 $\mu$m, and the particles of 90 volume percent of the zirconia powder had a diameter of 1.0 $\mu$m.

EXAMPLE 3

Into the mill of the same type as used in Example 1, added were 4 kg of the same type of the raw material powder as used in Example 1, 60 g of maleic acid type partially esterified polymer dispersant (Floren G-700: a product of Kyoeisha Kagaku Co., Ltd.) as a dispersant, and 4.06 kg of a mixture of toluene/ethanol (weight ratio:4/1) as a solvent. The mill included 4 kg of zirconia balls having a diameter of 0.5 mm (specific gravity: 6 g/cm$^3$). The mixture was wet-milled at 6 m/sec at the outer periphery of the rotor driven by a motor for 20 minutes to produce a slurry. In this case, X was $1.3 \times 10^{13}$.

The slurry was subjected to the same steps as in Example 1 to produce a zirconia powder. The particle size of the zirconia powder was measured by the same manner as in Example 1. The zirconia powder had an average particle diameter of 0.27 μm, and the particles of 90 volume percent of the zirconia powder had a diameter of 0.8 μm.

EXAMPLE 4

Into the mill of the same type as used in Example 1, added were 3.5 kg of the same type of the raw material powder as used in Example 1, and 6.5 kg of pure water as a solvent. The mill included 4.2 kg of zirconia balls (specific gravity: 6 g/cm$^3$) having a diameter of 1 mm. The mixture was wet-milled at the peripheral velocity of 6.4 m/sec at the outer periphery of the rotor driven by a motor for 1 hour and 40 minutes to produce a slurry. In this case, X was $9.3 \times 10^{13}$.

The slurry was subjected to the same steps as in Example 1 to produce a zirconia powder. The particle size of the zirconia powder was measured by the same manner as in Example 1. The zirconia powder had an average particle diameter of 0.49 μm, and the particles of 90 volume percent of the zirconia powder had a diameter of 1.03 μm.

EXAMPLE 5

Into the mill of the same type as used in Example 1, added were 3 kg of commercially available zirconia powder (TZ-8Y: a product of Tosoh Co., Ltd.) having an average particle diameter of 1.12 μm and in which the particles of 90 volume percent thereof had a diameter of 4.65 μm as a raw material powder, and 7 kg of pure water as a solvent. The mill included 4.5 kg of zirconia balls having a particle diameter of 0.5 mm (specific gravity: 6 g/cm$^3$). The mixture was wet-milled at the peripheral velocity of 6 m/sec at the outer periphery of the rotor driven by a motor for 80 minutes to produce a slurry. In this case, X was $8.8 \times 10^{13}$.

The slurry was subjected to the same steps as in Example 1 to produce a zirconia powder. The particle size of the zirconia powder was measured by the same manner as in Example 1. The zirconia powder had an average particle diameter of 0.74 μm and the particles of 90 volume percent of the zirconia powder had a diameter of 1.49 μm.

EXAMPLE 6

Into the mill of the same type as used in Example 1, added were 4 kg of the same type of the raw material powder as used in Example 1, 30 g of maleic acid type partially esterified polymer dispersant (Bunsan G-200: a product of Kyoeisha Kagaku Co., Ltd.), and 6 kg of pure water as a solvent. The mill included 4 kg of zirconia balls having a diameter of 1 mm (specific gravity: 6 g/cm$^3$). The mixture was wet-milled at the peripheral velocity of 7 m/sec at the outer periphery of the rotor driven by a motor for 12 minutes to produce a slurry. In this case, X was $1.1 \times 10^{13}$.

The slurry was subjected to the same steps as in Example to produce a zirconia powder. The particle diameter of the zirconia powder was measured by the same manner as that conducted in Example 1. The zirconia powder had an average particle diameter of 0.6 μm, and the particles of 90 volume percent of the zirconia powder had a diameter of 1.27 μm.

COMPARATIVE EXAMPLE 1

A zirconia powder of Comparative Example 1 was produced by repeating the steps of Example 1, except that 3.5 kg of raw material powder, 5.25 kg of pure water, and 5 kg of zirconia balls were used, and that the wet-milling was conducted for 90 minutes. In this case, X was $1.4 \times 10^{14}$. The result found that the mill did not operate well because the pipes thereof were clogged with the mixture. Therefore, the mixture could not be wet-milled.

COMPARATIVE EXAMPLE 2

A zirconia powder was produced by repeating the steps of Example 1, except that 4 kg of raw material powder, 5.25 kg of pure water, and 2.8 kg of zirconia balls were used, and that the wet-milling was conducted at the peripheral velocity of 5 m/sec at the outer periphery of the rotor for 4 minutes to produce a slurry. In this case, X was $8.8 \times 10^{11}$.

The slurry was subjected to the same steps as in Example 1 to produce a zirconia powder. The particle diameter of the zirconia powder had an average particle diameter of 0.81 μm and the particles of 90 volume percent of the zirconia powder had a diameter of 2.05 μm.

Table 1 shows the relationship between the particle diameters of the zirconia powders produced in Examples 1 to 6 and Comparative Examples 1 and 2, and the value X.

TABLE 1

| No. | | X | Average particle diameter (μm) | Particle diameter of 90 volume percent (μm) |
|---|---|---|---|---|
| Example | 1 | $5.3 \times 10^{13}$ | 0.66 | 1.3 |
| | 2 | $3.3 \times 10^{12}$ | 0.48 | 1.0 |
| | 3 | $1.3 \times 10^{13}$ | 0.27 | 0.8 |
| | 4 | $9.3 \times 10^{13}$ | 0.49 | 1.03 |
| | 5 | $8.8 \times 10^{13}$ | 0.74 | 1.49 |
| | 6 | $1.1 \times 10^{13}$ | 0.61 | 1.27 |
| Comparative Example | 1 | $1.4 \times 10^{14}$ | — | — |
| | 2 | $8.8 \times 10^{11}$ | 0.81 | 2.05 |

As seen in Table 1, when X was $1 \times 10^{12}$ to $1 \times 10^{14}$, the wet milling was sufficiently conducted, and the zirconia powder of the present invention was obtained. However, when X was $1 \times 10^{14}$ or larger and $1 \times 10^{12}$ or smaller, the wet milling could not be sufficiently conducted. Therefore, as compared with those of the present invention, the resultant zirconia powder had larger average particle diameter and the particles of 90 volume percent thereof had larger diameter, even though using the same type of raw material powder.

[Comparison of the properties of zirconia powders]

Measurement was taken for the following zirconia powders to obtain the respective average particle diameters, the diameters of the particles of 90 volume percent thereof, the maximum particle diameters, and the standard variations by the same manner as that of Example 1:

A commercially available zirconia powder A (OZC-8YC; a product of Sumitomo Osaka Cement Co., Ltd.);

A commercially available zirconia powder B (TZ-8Y; a product of Tosoh Co., Ltd.);

A commercially available zirconia powder C (HSY-8.0; a product of Daiichi Kigenso Co., Ltd.);

A zirconia powder produced by the method of the present invention (under the conditions shown in Table 2); and A zirconia powders E and F produced according to the prior applications of the present application (No. Japanese Unexamined Patent Publication No. 8-151270).

The results of the measurement are shown in Table 3.

TABLE 2

| Milling conditions | D |
|---|---|
| Peripheral velocity ωat outer periphery of rotor (cm/min) | 56270 |
| Number of rotation of rotor (rpm) | 2240 |
| Total weight $W_1$ of balls (g) | 2770 |
| Weight $W_2$ of raw material powder (g) | 2000 |
| Diameter d of milling chamber (cm) | 8 |
| Milling time T (min) | 15 |
| Slurry concentration (%) | 61.0 |
| X | $2.3 \times 10^{13}$ |

TABLE 3

| No. | Average particle diameter (μm) | Particle diameter of 90 volume percent (μm) | Standard deviation | Maximum particle diameter (μm) |
|---|---|---|---|---|
| A | 0.81 | 2.65 | 1.24 | 5.5 |
| B | 1.12 | 4.65 | 1.91 | 9.0 |
| C | 0.78 | 2.19 | 0.65 | 3.3 |
| D | 0.73 | 1.04 | 0.18 | 1.2 |
| E | 0.26 | 0.71 | 0.31 | 2.3 |
| F | 0.24 | 0.56 | 0.20 | 1.1 |

As seen in Table 3, the zirconia powder D of the present invention had an average particle diameter smaller than that of the commercially available zirconia powders A and B, and larger than that of the zirconia powders E and F. In addition, the zirconia powder D had a particle size distribution curve sharper than that of the commercially available zirconia powder C, although the zirconia powder C had a similar average particle diameter as the zirconia powder D. From these results, it has been found that the zirconia powder D of the present invention had high uniformity.

[Production of zirconia ceramics]

Method for evaluating the properties of zirconia ceramics

The properties of the zirconia ceramics were indicated by Weibull modulus (m). Weibull modulus (m) was obtained by the following steps. First, 20 sheet-shaped test pieces having a width of 4 mm, a thickness of 0.2 mm, and a length of 40 mm were produced. Without adjusting the surface roughness and cutting-off the edges of the test pieces, the three-point bending strength of the test pieces was measured by a method defined in JIS R1601. Then, based on Formula 1, a graph was made in a two-dimensional coordinate of $\ln\ln\{1/(1-P_f)\}$ as y-axis and $\ln(\sigma_f-\sigma_u)$ as x-axis.

$$\ln\ln\left(\frac{1}{1-P_f}\right) = m\ln(\sigma_f - \sigma_u) - m\ln\sigma_0 \quad \text{[Formula 1]}$$

In Formula 1, $P_f$ is failure probability, and is defined as $P_f=n/(N+1)$ (N is the number of samples, and n is n-th sample.). $\sigma_f$ is breaking bending strength, m is Weibull modulus, $\sigma_0$ is a standardized factor, and $\sigma_u$ is a stress obtained when $P_f$ is 0. The obtained three-point bending strength was substituted into $\sigma_f$. The intercept of the graph corresponded to $-m\ln \sigma_0$, and the inclination of the graph corresponded to Weibull modulus (m). The value of the inclination of the graph was obtained by a least square method.

Formula 1 is shown in the report titled "Strength, Reliability and Life Prediction of Ceramics" in "Refractory material" 39–489, 1987-No. 9 written by Yoshiharu Ozaki, on page 11, in right column, as Formula (2).

Zirconia powder used in producing the zirconia ceramics

Using three types of zirconia powders described below, three types of zirconia ceramics in the form of sheet were produced.

① The zirconia powder produced in Example 1.

② The zirconia powder having an average particle diameter of 0.6 μm and the maximum particle diameter of 3.7 μm, in which the particles of 90 volume percent thereof had a diameter of 1.12 μm. The zirconia powder was produced by the following steps:

Into AMV-1 type Apex Mill, added were 5.5 kg of commercially available zirconia powder (OZC-8YC: a product of Sumitomo Osaka Cement Co., Ltd.) having an average particle diameter of 0.84 μm in which the particles of 90 volume percent had a diameter of 2.65 μm, 44 g of formic acid as a dispersant, and 4.544 kg of pure water as a solvent. The mixture was wet-milled under the following conditions:

Balls: 4 kg of zirconia balls having a diameter of 0.5 mm;

Peripheral velocity at the outer periphery of the rotor: 5 m/sec (driven by motor); and Milling time: 10 minutes ③ A commercially available zirconia powder having an average particle of 0.84 μm and the maximum particle diameter of 7.8 μm, in which the particles of 90 volume percent had a diameter of 2.65 μm.

Production of the sheet-shaped zirconia ceramics

Into 100 parts by weight of zirconia powder ①, added were 50 parts by weight of a mixture of toluene/ethyl acetate (weight ratio: 1/1) in which 15 parts by weight of methacrylic acid ester copolymer was dissolved, and 2 parts by weight of dibutylphthalate as a plasticizer. The mixture was mixed with a ball mill, and after adjusting its viscosity, the resultant was formed into a green sheet having a thickness of 0.25 mm by a doctor blade method.

The green sheet was sintered at 1450° C. for 2 hours to produce a zirconia ceramic sheet having a thickness of 0.2 mm. Weibull modulus (m) of the sheet was obtained by the above-described method.

The same steps were repeated using the zirconia powders ② and ③, respectively.

The relationship between Weibull modulus (m) and the particle diameters are shown in Table 4.

Production of bulk-shaped zirconia ceramics

The zirconia powder ① was put into a rubber bag, and hydrostatic pressure of 2000 kg/cm² was applied thereto for 10 minutes to produce a bulk-shaped zirconia ceramics having a width of 30 mm, a thickness of 6 mm, and a length of 100 mm. Then, the bulk-shaped zirconia ceramics was cut into a piece having a width of 4 mm, a thickness of 4 mm, and a length of 40 mm. After polishing the surface of the cut piece, the piece was sintered at 1500° C. for 2 hours. As a result, a test piece was obtained.

The same steps were repeated using the zirconia powders ② and ③ respectively.

Weibull modulus (m) of the test pieces was obtained by the above-described method. The relationship between Weibull modulus (m) and the particle diameters is shown in Table 4.

TABLE 4

| | Zirconia powder | | | Weibull modulus (m) | |
|---|---|---|---|---|---|
| Kind of zirconia powder | Average particle diameter (μm) | Particle diameter of 90 volume percent (μm) | Maximum particle diameter (μm) | Sheet-shaped zirconia ceramics | Bulk-shaped zirconia ceramics |
| Present Example ① | 0.66 | 1.3 | 3.7 | 11 | 13 |
| Present Example ② | 0.6 | 1.12 | 3.7 | 11 | 12 |
| Comparative Example ③ | 0.84 | 2.65 | 7.8 | 9 | 10 |

As seen in Table 4, the sheet-shaped and the bulk-shaped zirconia ceramics produced using the zirconia powders ① and ②, which correspond to the present invention, had high Weibull modulus (m). This result shows that the zirconia ceramics had uniform quality and high reliability.

From this result, it is apparent that the use of a zirconia powder having an average particle diameter and a particle size distribution as specified in the present invention makes it possible to produce a zirconia ceramics having uniform quality and high strength Although the present invention has been fully described by way of example with reference to the accompanying drawings, it is to be understood that various changes and modifications will be apparent to those skilled in the art. Therefore, unless otherwise such changes and modifications depart from the scope of the present invention, they should be construed as being included therein.

What is claimed is:

1. A zirconia powder comprising yttrium oxide, wherein a volume average particle diameter of the zirconia powder is larger than 0.5 μm but does not exceed 0.8 μm, and
   90 volume percent of the zirconia powder is composed of particles having a particle diameter larger than 1.0 μm but not exceeding 1.5 μm.

2. The zirconia powder according to claim 1, wherein the zirconia powder comprises 5 to 18 weight percent yttrium oxide.

3. The zirconia powder according to claim 2, wherein the zirconia powder is produced by wet-milling.

4. The zirconia powder according to claim 1, wherein the zirconia powder is produced by wet-milling.

5. The zirconia powder according to claim 1, wherein a maximum particle diameter of the zirconia powder is larger than 1.5 μm but does not exceed 10 μm.

6. A method for producing a zirconia powder comprising
   wet-milling a raw material powder using balls under a condition satisfying a mathematical relation:

$$1 \times 10^{12} \leq (W_1^2 \div W_2) \times (\omega^2 \div d) \times T \leq 1 \times 10^{14}$$

where $W_1$ denotes a weight (g) of balls, $W_2$ indicates a weight (g) of the raw material powder, $\omega$ denotes a peripheral velocity (cm/min) at an outer periphery of a rotor, d denotes a diameter (cm) of a milling chamber, and T denotes a milling time (min), and
   forming the zirconia powder of claim 1.

7. The method according to claim 6, wherein the raw material powder has a volume average particle diameter of larger than 0.8 μm, and
   more than 10 volume percent of the raw material powder is composed of particles having a particle diameter of larger than 1.5 μm.

8. A method for producing a zirconia powder comprising
   wet-milling a raw material powder using balls under a condition satisfying a mathematical relation:

$$1 \times 10^{12} \leq (W_1^2 \div W_2) \times (\omega^2 \div d) \times T \leq 5 \times 10^{13}$$

where $W_1$ denotes a weight (g) of balls, $W_2$ indicates a weight (g) of the raw material powder, $\omega$ denotes a peripheral velocity (cm/min) at an outer periphery of a rotor, d denotes a diameter (cm) of a milling chamber, and T denotes a milling time (min), and
   forming the zirconia powder of claim 1.

9. The method according to claim 8, wherein the raw material powder has a volume average particle diameter of 0.8 μm or larger, and
   10 volume percent or more of the raw material powder is composed of particles having a particle diameter of larger than 1.5 μm.

10. A method for producing zirconia powder comprising
    wet-milling using balls a slurry containing 30 to 70 weight percent of a raw material powder under a condition satisfying a mathematical relation:

$$1 \times 10^{12} \leq (W_1^2 \div W_2) \times (\omega^2 \div d) \times T \leq 1 \times 10^{14}$$

where $W_1$ denotes a weight (g) of balls, $W_2$ indicates a weight (g) of the raw material powder, $\omega$ denotes a peripheral velocity (cm/min) at an outer periphery of a rotor, d denotes a diameter (cm) of a milling chamber, and T denotes a milling time (min), and
    forming the zirconia powder of claim 1.

11. The method according to claim 10, wherein the raw material powder has a volume average particle diameter of larger than 0.8 μm, and
    10 volume percent or more of the raw material powder is composed of particles having a particle diameter of larger than 1.5 μm.

12. The method according to claim 10, wherein the slurry includes 0.01 to 5 weight percent of a dispersant with respect to the raw material powder.

* * * * *